US012705349B1

(12) United States Patent
Moysi et al.

(10) Patent No.: US 12,705,349 B1
(45) Date of Patent: Aug. 11, 2026

(54) SYSTEM AND METHOD FOR SOURCE TRUST-BASED DETECTION OF CYBERSECURITY ISSUES IN A COMPUTING ENVIRONMENT

(71) Applicant: Wiz, Inc., New York, NY (US)

(72) Inventors: Liran Moysi, Kfar Saba (IL); Gilad Maymon, Tel Aviv (IL); Daniel Velikanski, Tel Aviv (IL); Pavel Resnianski, Tel Aviv (IL); Ofir Cohen, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/538,072

(22) Filed: Feb. 12, 2026

(51) Int. Cl.
*G06F 21/55* (2013.01)
*G06F 21/56* (2013.01)

(52) U.S. Cl.
CPC .......... *G06F 21/554* (2013.01); *G06F 21/562* (2013.01)

(58) Field of Classification Search
CPC ............................. G06F 21/554; G06F 21/562
See application file for complete search history.

(56) References Cited

U.S. PATENT DOCUMENTS

| | | | | |
|---|---|---|---|---|
| 11,374,961 | B2 * | 6/2022 | Brooks | H04L 63/123 |
| 11,677,786 | B1 * | 6/2023 | Vashisht | H04L 63/1433 726/22 |
| 12,056,708 | B2 * | 8/2024 | Kim | H04L 9/50 |
| 12,579,024 | B1 * | 3/2026 | Segal | G06F 11/0793 |
| 2024/0289464 | A1 * | 8/2024 | Tishbi | G06F 21/577 |
| 2024/0330487 | A1 * | 10/2024 | Gorog | G06F 21/602 |
| 2024/0414211 | A1 * | 12/2024 | Boyer | H04L 63/1416 |
| 2025/0047702 | A1 * | 2/2025 | Formicola | H04L 63/1433 |
| 2025/0063063 | A1 * | 2/2025 | Tishbi | G06F 16/9024 |

* cited by examiner

*Primary Examiner* — Gary S Gracia
(74) *Attorney, Agent, or Firm* — M&B IP Analysts, LLC

(57) ABSTRACT

A system or method for trust-aware cybersecurity detection is presented. The method includes receiving from a computing environment a plurality of cybersecurity signals; detecting in a first cybersecurity signal of the plurality of cybersecurity signals a cybersecurity issue and an identifier of a resource associated with the cybersecurity issue; determining a trust score of the resource based at least on the identifier; selecting a response action based on the cybersecurity issue; adapting the response action based on the trust score; and initiating the adapted response action in the computing environment.

13 Claims, 5 Drawing Sheets

SYSTEM AND METHOD FOR SOURCE TRUST-BASED DETECTION OF CYBERSECURITY ISSUES IN A COMPUTING ENVIRONMENT

TECHNICAL FIELD

The present disclosure relates generally to cloud computing security and software supply chain management, specifically to systems for detecting cybersecurity threats based on source-based inventories having assigned trust levels and enforcing policies that govern the use of components such as images, libraries, AI models, and third-party services.

BACKGROUND

In modern cloud and distributed computing environments, cybersecurity detection mechanisms are increasingly challenged by the scale, diversity, and dynamism of deployed entities. Organizations operate thousands of workloads composed of containers, virtual machines, software images, code objects, APIs, and third-party services, all generating continuous streams of telemetry. Traditional detection systems typically evaluate security events in isolation, focusing on indicators such as anomalous behavior, known vulnerability signatures, or rule-based thresholds, without sufficient contextual understanding of where an entity originated or how much confidence can be placed in it.

This leads to significant operational challenges. Security tools often generate large volumes of alerts with similar severity levels, even though the underlying entities may differ substantially in provenance, maintenance quality, or historical reliability. As a result, security teams struggle to distinguish between benign anomalies originating from well-maintained components and genuinely dangerous activity stemming from unknown or poorly governed sources. This contributes to alert fatigue, delayed response times, and inefficient prioritization of security incidents.

Additionally, modern software supply chains introduce indirect attack vectors in which threats are embedded upstream, such as within open-source libraries, container base images, or external services. When runtime anomalies or suspicious events occur, existing detection frameworks may lack the ability to correlate those signals with source characteristics, ownership changes, or trust degradation over time. Consequently, subtle but high-risk incidents may be under-prioritized, while low-impact events trigger unnecessary escalation.

As cloud environments continue to evolve, the absence of detection mechanisms that account for trust context exacerbates exposure to supply chain attacks, insider threats, and advanced persistent threats. This gap highlights the need for improved detection paradigms capable of incorporating richer contextual signals beyond raw behavioral indicators.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by data processing apparatus, cause the apparatus to perform the actions.

In one general aspect, the method may include receiving from a computing environment a plurality of cybersecurity signals. The method may also include detecting in a first cybersecurity signal of the plurality of cybersecurity signals a cybersecurity issue and an identifier of a resource associated with the cybersecurity issue; determining a trust score of the resource based at least on the identifier; selecting a response action based on the cybersecurity issue; adapting the response action based on the trust score; initiating the adapted response action in the computing environment. Other embodiments of this aspect include corresponding computer systems, apparatus, and computer programs recorded on one or more computer storage devices, each configured to perform the actions of the methods.

Implementations may include one or more of the following features. The method may include receiving runtime detections from a sensor deployed on a resource in the computing environment as a first cybersecurity signal of the plurality of cybersecurity signals; receiving a static analysis result as a second cybersecurity signal of the plurality of cybersecurity signals; detecting a disk of the resource; generating an inspectable disk based on the detected disk; generating the static analysis result based on statically analyzing the inspectable disk for a cybersecurity object; detecting a code repository in the computing environment, the code repository including a plurality of code objects; and generating the static analysis result based on statically analyzing a code object of the plurality of code object; detecting a software image repository in the computing environment, the software image repository including a plurality of software images; generating the static analysis result based on statically analyzing a software image of the plurality of software images; detecting in the computing environment an event log, the event log including a plurality of event records; extracting the plurality of event records from the event log; and receiving a second cybersecurity signal of the plurality of cybersecurity signals based on the extracted plurality of event records; selecting the response action from a plurality of response actions, each response action corresponding to the cybersecurity issue; selecting the response action further based on the trust score. Implementations of the described techniques may include hardware, a method or process, or a computer tangible medium.

In one general aspect, non-transitory computer-readable medium may include one or more instructions that, when executed by one or more processing circuitries of a device, cause the device to receive from a computing environment a plurality of cybersecurity signals. Medium may furthermore include detect in a first cybersecurity signal of the plurality of cybersecurity signals a cybersecurity issue and an identifier of a resource associated with the cybersecurity issue; determine a trust score of the resource based at least on the identifier; select a response action based on the cybersecurity issue; adapt the response action based on the trust score; and initiate the adapted response action in the computing environment. Other embodiments of this aspect include corresponding computer systems, apparatus, and computer programs recorded on one or more computer storage devices, each configured to perform the actions of the methods.

In one general aspect, the system may include a processing circuitry. The system may also include a memory, the memory containing instructions that, when executed by the processing circuitry, configure the system to receive from a computing environment a plurality of cybersecurity signals; detect in a first cybersecurity signal of the plurality of cybersecurity signals a cybersecurity issue and an identifier of a resource associated with the cybersecurity issue; determine a trust score of the resource based at least on the identifier; select a response action based on the cybersecurity issue; adapt the response action based on the trust score; initiate the adapted response action in the computing environment. Other embodiments of this aspect include corresponding computer systems, apparatus, and computer programs recorded on one or more computer storage devices, each configured to perform the actions of the methods.

Implementations may include one or more of the following features. The system where the memory contains further instructions which, when executed by the processing circuitry, further configure the system to receive runtime detections from a sensor deployed on a resource in the computing environment as a first cybersecurity signal of the plurality of cybersecurity signals.

The system where the memory contains further instructions which, when executed by the processing circuitry, further configure the system to receive a static analysis result as a second cybersecurity signal of the plurality of cybersecurity signals.

The system where the memory contains further instructions which, when executed by the processing circuitry, further configure the system to detect a disk of the resource; generate an inspectable disk based on the detected disk; and generate the static analysis result based on statically analyzing the inspectable disk for a cybersecurity object.

The system where the memory contains further instructions which, when executed by the processing circuitry, further configure the system to detect a code repository in the computing environment, the code repository including a plurality of code objects; and generate the static analysis result based on statically analyzing a code object of the plurality of code object.

The system where the memory contains further instructions which, when executed by the processing circuitry, further configure the system to detect a software image repository in the computing environment, the software image repository including a plurality of software images; and generate the static analysis result based on statically analyzing a software image of the plurality of software images.

The system where the memory contains further instructions which, when executed by the processing circuitry, further configure the system to detect in the computing environment an event log, the event log including a plurality of event records; extract the plurality of event records from the event log; and receive a second cybersecurity signal of the plurality of cybersecurity signals based on the extracted plurality of event records.

The system where the memory contains further instructions which, when executed by the processing circuitry, further configure the system to select the response action from a plurality of response actions, each response action corresponding to the cybersecurity issue.

The system where the memory contains further instructions which, when executed by the processing circuitry, further configure the system to select the response action further based on the trust score. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
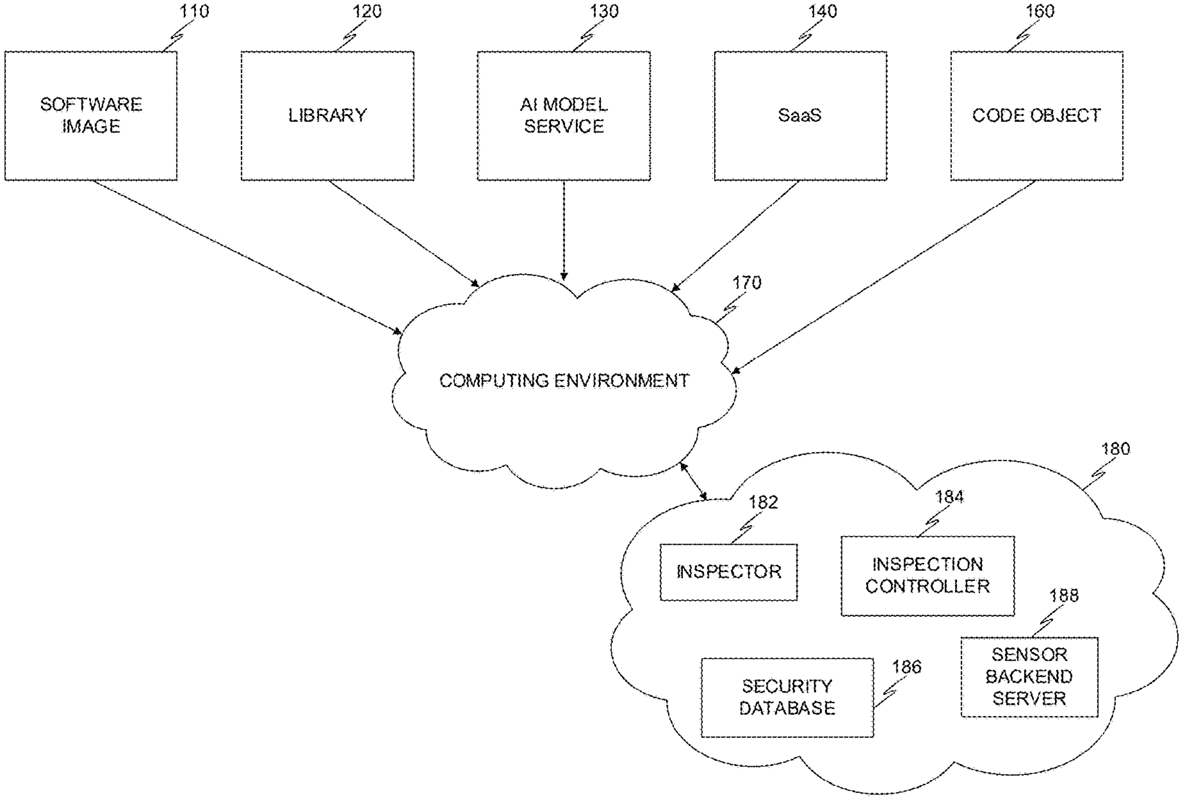
FIG. 1 is an example schematic illustration of a computing environment monitored by an inspection environment, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic illustration of a computing environment monitored by an inspection environment, utilized to describe an embodiment. In an embodiment, a computing environment 170 includes a cloud computing environment, a hybrid computing environment, an on-prem computing environment, a combination thereof, and the like. In some embodiments, a computing environment 170 includes a virtual private cloud, a virtual network, a virtual private network, a combination thereof, and the like.

According to an embodiment, a cloud computing environment is deployed on a cloud computing infrastructure provided by a cloud service provider (CSP) such as Google® Cloud Platform (GCP), Amazon® Web Services (AWS), Microsoft® Azure, and the like.

In an embodiment, the computing environment 170 includes a plurality of resources, a plurality of principals, combinations thereof, and the like. In an embodiment, a resource is a virtualization, instantiated based on a software artifact, code object, and the like. In some embodiments, a principal is a cloud entity which is authorized to initiate an action in the computing environment 170, such as a user account, a service account, a role, a group, combinations thereof, and the like.

In some embodiments, a software image 110 is utilized to deploy a resource in the computing environment 170. In an embodiment, a software image 110 is used to deploy a resource by serving as a preconfigured template including an operating system, dependencies, and application code. In a computing environment 170, an orchestrator, provisioning tool, etc., such as Kubernetes, AWS EC2, Terraform, etc., instantiate new instances directly from the software image 110.

In certain embodiments, a resource utilizes a software library 120. In some embodiments, the software library 120 is external to the computing environment 170. In an embodiment, the software library 120 is managed by a third party which is not associated with the computing environment 170.

In an embodiment, the computing environment 170 utilizes an artificial intelligence (AI) software service 130 through APIs, SDK integrations, and the like, to perform tasks such as data analysis, natural language processing, model inference. etc. In an embodiment, an AI software service 130 introduces cybersecurity threats to the computing environment 170, such as data leakage, unauthorized access, model tampering, dependency poisoning, and the like. In certain embodiments, unverified or compromised AI providers expose a computing environment 170 to supply chain attacks, unauthorized data exfiltration, and the like.

According to an embodiment, the computing environment 170 is configured to utilize a software as a service (SaaS) 140. In an embodiment, the SaaS 140 includes Salesforce® for customer relationship management, Google® Workspace for productivity software tools, Slack® for communication, Zoom® for video conferencing, ServiceNow® for IT operations, various combinations thereof, and the like. In an embodiment, the SaaS 140 is hosted in a cloud computing environment, which is not the computing environment 170, and accessed by the computing environment 170 (including resources thereof) through a web interface, AP, and the like.

In an embodiment, the computing environment 170 is configured to access, retrieve, and otherwise receive a code object, such as code object 160, for processing, deployment, and the like. In some embodiments, the code object 160 originates from a managed source, including a code repository (such as GitHub, GitLab, Bitbucket, etc.), where application source code and configuration files are stored and versioned.

In some embodiments, the code object 160 is received through a version control system (VCS) (such as Git, Subversion, etc.), which enable consistent tracking of changes and rollback capabilities. In an embodiment, the code object 160 is generated, obtained, etc., from an Infrastructure-as-Code (IaC) platform (such as Terraform®, AWS CloudFormation, Pulumi®, etc.), which define infrastructure components programmatically.

In certain embodiments, the computing environment 170 is configured to integrate a plurality of sources and obtain code objects, such as code object 160, from each of these sources. In an embodiment, the code object is a managed code object. In some embodiments, the code object 160 is utilized to deploy, instantiate, etc., a virtualization in the computing environment 170.

In some embodiments, the computing environment 170 is monitored by an inspection environment 180. According to an embodiment, the inspection environment 180 is implemented utilizing a cloud computing environment, an on-prem environment, a hybrid computing environment, a combination thereof, and the like.

In an embodiment, the inspection environment 180 includes an inspector 182, an inspection controller 184, a security database 186, a sensor backend server 188, a combination thereof, and the like. In an embodiment, the inspector 182 is configured to initiate static analysis on code objects, files, software images, and the like, and detected therefrom cybersecurity objects. According to an embodiment, a cybersecurity object is a code object, a file, a file system, a binary, a library, a software application, a cryptographic key, a certificate, a combination thereof, and the like.

In some embodiments, the inspector 182 is configured to detect a cybersecurity object on a resource, on a software artifact (e.g., a software image 110, a library 120, an AI model, a code object 160, etc.), and generate a finding. In an embodiment, the finding is stored on a security database 186. In certain embodiments, the security database 186 is configured to store a representation of a computing environment, for example, utilizing a unified schema so as to store a unified representation of a multi-cloud computing environment.

According to an embodiment, an inspection controller 184 is configured to provision inspector workloads, such as inspector 182. In some embodiments, the inspection controller 184 is configured to detect a resource of the computing environment 170, generate an inspectable disk based on a disk of the resource, and provision an inspector 182 to inspect the inspectable disk. In an embodiment, generating an inspectable disk includes generating a snapshot of a disk (and then generating an inspectable disk therefrom), generating a clone of a disk, generating a copy of a disk, a combination thereof, and the like.

In certain embodiments, the inspection controller 184 is configured to determine a trust level, trust score, etc., associated with a source of a software artifact. For example, in an embodiment, the software image 110 is stored in a repository which has a 'low' trust level. In some embodiments, the trust level, trust score, etc., includes a qualitative indicator (e.g., low, high, medium, etc.), a quantitative indicator (e.g., '1' through '100'), a combination thereof, and the like.

In an embodiment, the inspection controller 184 is configured to generate a user interface and receive through the user interface (such as a graphical user interface) an input from a user which indicates a trust level, trust score, etc.

According to an embodiment, the inspection controller 184 is configured to receive, generate, etc., a policy, and apply the policy on a representation of the computing environment 170 stored in the security database 186. In some embodiments, the security database 186 includes a representation of the computing environment 170, including a representation of a principal, a representation of a resource, an enrichment, metadata, API endpoints, public network, various combinations thereof, and the like. In an embodiment, the representation is generated based on a finding, a detection, and the like, detected by the inspector 182.

For example, in an embodiment, the representation stored in the security database 186 includes a representation of a code object, a representation of a virtualization deployed in the computing environment 170 based on the code object, a representation of the repository in which the code object was detected, metadata indicating a trust score of the repository, and the like. In an embodiment, a representation is connected to another representation to indicate a relationship between the objects being represented. For example, connecting the representation of the code object to the representation of the repository indicates that the code object was detected (e.g., by an inspector 182) in the repository. In an embodiment, the representation of the computing environment includes a software inventory, also referred to as an SBOM. In some embodiments, the software inventory is generated based on results of inspecting the computing environment 170.

In some embodiments, applying a policy on the security database 186 allows for generating a cybersecurity risk score based on a detected cybersecurity object (indicating a cybersecurity risk) and a trust score. For example, where a cybersecurity object indicating a cybersecurity risk is detected on a resource deployed from a software image 110, and the software image 110 is detected in a repository having a low trust score, the overall cybersecurity risk score is elevated due to the low trust score.

Conversely, where the trust score is high, the overall cybersecurity risk score remains the same, is lowered, etc., as the risk associated with a trusted source is often lower than a risk associated with an untrusted source.

In turn, this allows to prioritize corrective actions, such as remediation, mitigation, and the like, which improves the overall cybersecurity posture of the computing environment. Addressing cybersecurity issues in an order indicating their severity improves the overall functionality of the cloud computing environment, as a secure computing environment functions better than an unsecured environment. This is due, for example, to an unsecure environment being susceptible to exploitation, which detracts from the available computing resources.

In certain embodiments, the inspection environment 180 includes a sensor backend server 188, which is configured to receive runtime data (e.g., as aggregate runtime execution data), runtime detections, combinations thereof, and the like. In an embodiment, a resource deployed in the computing environment 170 includes a sensor application deployed thereon. In some embodiments, a sensor is configured to detect runtime events on the resource.

In an embodiment, the sensor is configured to detect a runtime event and send a detection to the sensor backend server 188. In some embodiments, the sensor is configured to aggregate runtime data and send aggregated runtime data to the sensor backend server 188. In an embodiment, runtime data includes an identifier of a process executed on the resource, local resource usage (e.g., utilization of memory, storage, network bandwidth, etc.).

According to an embodiment, the inspection environment 180 is configured to generate signals from a plurality of sources, such as runtime data (e.g., from sensors), cloud data (e.g., cloud logs, network logs, etc.), static analysis (e.g., results from inspection by the inspector 182), a combination thereof, and the like. In an embodiment, the inspection controller 184 is configured to detect cybersecurity issues based on a plurality of cybersecurity signals.

Figure 2:
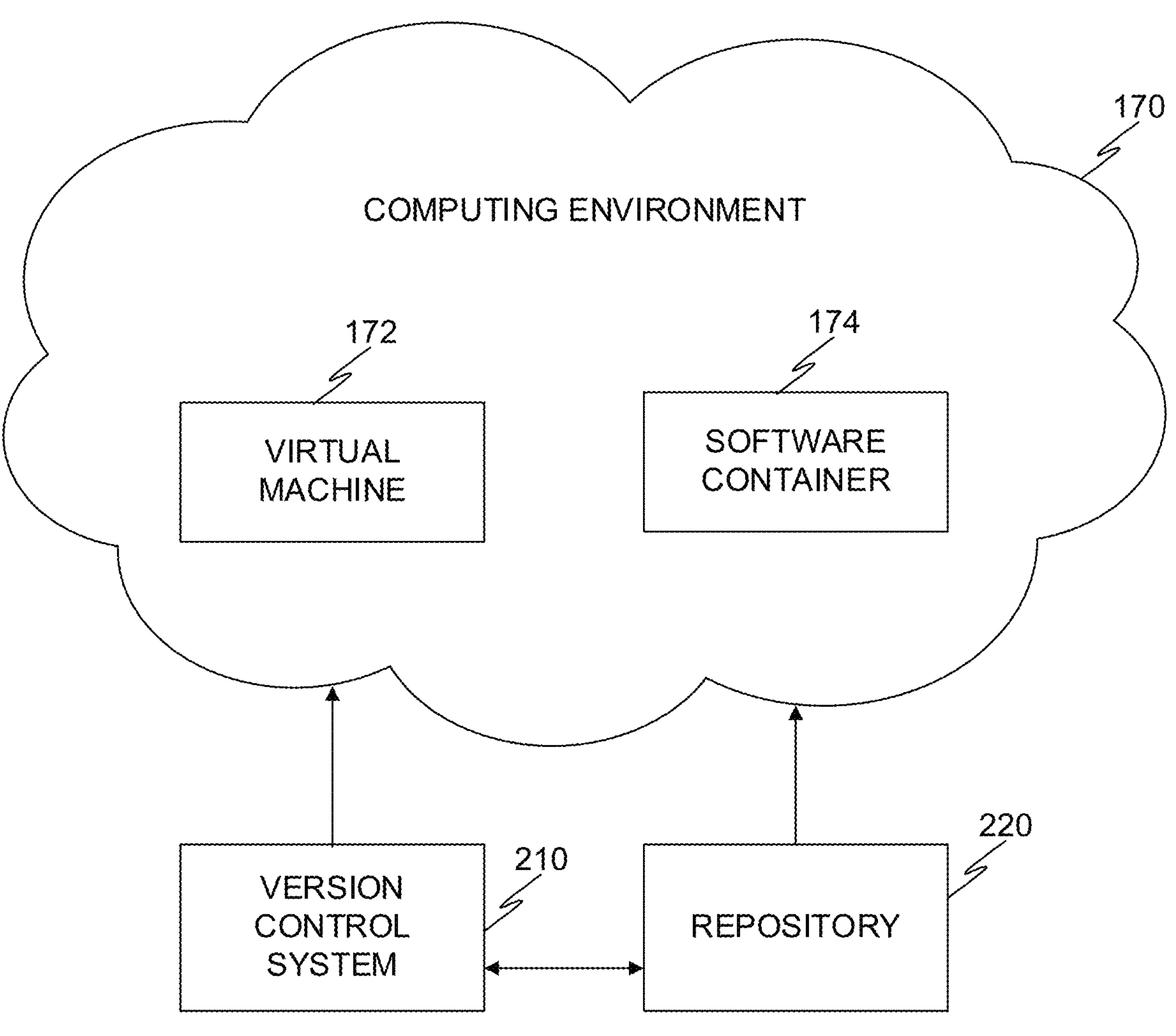
FIG. 2 is an example schematic diagram of a computing deploying virtual instances therein from multiple sources, utilized to describe an embodiment.

FIG. 2 is an example schematic diagram of a computing deploying virtual instances therein from multiple sources, utilized to describe an embodiment. In an embodiment, a computing environment 170 includes a virtual machine 172 and a software container 174. According to an embodiment, a virtual machine 172, software container 174, etc., are deployed from a version control system 210 through a CI/CD-driven infrastructure-as-code workflow.

In an embodiment, a version-controlled definition file, such as a Terraform configuration, CloudFormation template, Ansible playbook, and the like, is stored in a repository 220, implemented using GitHub, GitLab, Bitbucket, and the like. When a commit or merge occurs, a CI/CD pipeline is triggered to fetch the latest configuration from the repository 220.

In an embodiment, the pipeline is configured to validate the code, initiate syntax and security checks, and utilize orchestration tools to generate a build artifact, e.g., in the form of a machine image (such as Amazon Machine Image or Azure Managed Image). Once validated, the pipeline is configured to communicate with an API of the computing environment 170 (e.g., AWS EC2, Azure Compute, Google Compute Engine, VMware vSphere, etc.) to instantiate the virtual machine 172 based on the defined parameters, such as the base image, compute size, networking, and storage.

Figure 3:
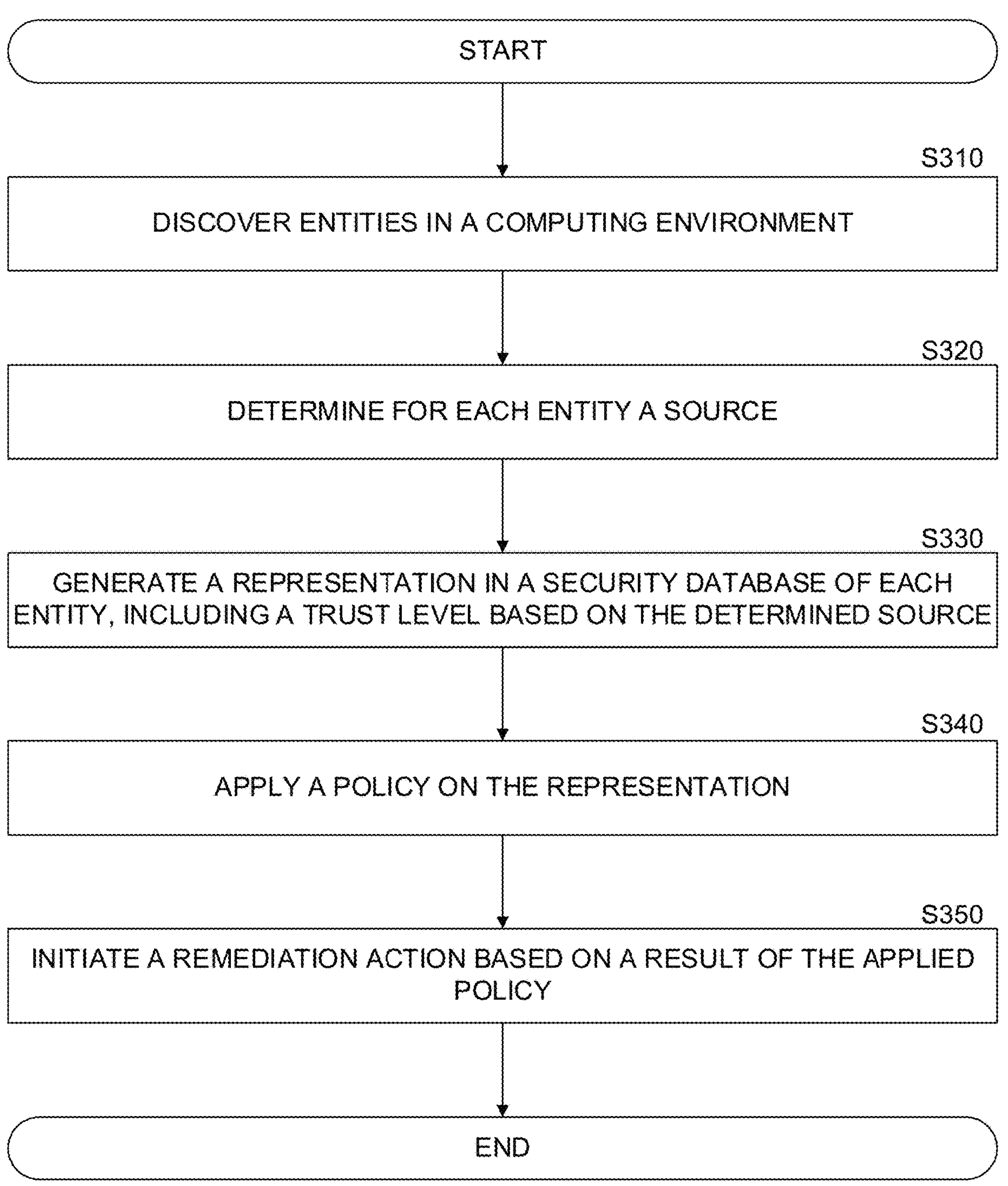
FIG. 3 is an example flowchart of a method for applying a trust-based policy on a representation of a computing environment, implemented in accordance with an embodiment.

FIG. 3 is an example flowchart of a method for applying a trust-based policy on a representation of a computing environment, implemented in accordance with an embodiment.

At S310, a plurality of entities are discovered in a computing environment. In an embodiment, an entity is a principal, resource, and the like. In some embodiments, an entity is deployed based on a software image, code object, combination thereof, and the like. In some embodiments, cloud entities such as virtual machines, containers, and serverless functions are deployed using software images, code objects, and related artifacts in a computing environment that define both the application and its execution context.

In an embodiment, deployment includes utilizing infrastructure and application definitions, such as Terraform templates, AWS CloudFormation stacks, or Kubernetes manifests, which describe the desired resources, configurations, and dependencies. In an embodiment, these definitions reference software images (e.g., Amazon Machine Images, Azure Managed Images, or Docker container images) that contain preconfigured operating systems, runtimes, and libraries required for execution.

In some embodiments, a deployment is initiated using an orchestration platform, such as AWS EC2, Google Compute Engine, or Kubernetes, which retrieves the specified image from a trusted repository or container registry (for example, Amazon ECR, Docker Hub, or Google Artifact Registry). In an embodiment, the platform is configured to provision the compute instance, container, etc., using the software image as the baseline, applying environment variables, networking settings, and storage volumes as defined in the configuration.

In certain embodiments, code objects such as application binaries, microservices, or scripts stored in version control systems (e.g., GitHub or GitLab) are integrated into the build pipeline. According to an embodiment, continuous integration tools are configured to compile and package these code objects, embedding them into the deployment image or mounting them as runtime artifacts.

At S320, determine a source for each entity. In an embodiment, a source is matched with a trust score. In some embodiments, an entity is detected from a source. For example, in an embodiment, an inspection controller is configured to access a repository, database, storage bucket, version control system, and the like, and detect software artifacts thereon, which are utilized in deploying virtual instances in a computing environment.

In an embodiment, a source is determined for each such entity, and a trust score is associated with the source, with the entity, etc. In some embodiments, the trust score is generated based on origin, publisher identity, digital signature status, historical reliability, update frequency, a combination thereof, and the like.

For example, according to an embodiment, a container image retrieved from a verified registry, such as Amazon ECR, with a valid cryptographic signature and consistent patch history, receives a higher trust score than an unsigned image from a public repository.

In some embodiments, the trust score is generated based on additional dimensions, including known vulnerability counts (e.g., from CVE/NVD databases), dependency relationships, prior security incidents associated with the source, etc. In certain embodiments, the trust score is further generated based on code quality metrics, maintainer activity, reputation data (e.g., from external feeds such as GitHub verification badges), a combination thereof, and the like.

In certain embodiments, the trust score is dynamically adjusted as new vulnerabilities, ownership changes, anomalous activities, and the like, are detected, ensuring continuous validation.

At S330, a representation is generated for each entity. In an embodiment, a representation is generated based on a unified schema. In some embodiments, the representation is generated in a security database. In an embodiment, the security database is implemented as a graph database, such as Neo4j®. In certain embodiments, the graph database includes nodes and edges, where a node represents entities, enrichments, cybersecurity issues, and the like, and edges represent relationships between nodes. In an embodiment, the representation is generated in a database system which includes a graph database, a relational database, an object-oriented database, various combinations thereof, and the like.

At S340, a policy is applied on the representation. In an embodiment, a policy includes a rule, conditional rule, an instruction to initiate an action based on a result of applying the policy, a combination thereof, and the like. In an embodiment, in response to applying a rule, a condition of a rule, etc., on a representation of a computing environment, a result is generated. In some embodiments, an action is initiated based on a value of the result. For example, in some embodiments, the result is a binary result (e.g., 'True' or 'False').

In an embodiment, a policy is a trust policy. In an embodiment, a trust policy is a defined set of rules and conditions that govern how a computing environment determines whether a software source, image, library, software service, and the like, is considered trustworthy enough for use or deployment. A trust policy formalizes the organization's security and compliance criteria into enforceable logic applied across a representation of a software supply chain.

In some embodiments, a trust policy specifies which origins, signatures, attributes, combinations thereof, and the like are required for an entity to be accepted. For example, a policy might allow deployment only of container images signed with an organization's private key, retrieved from a verified registry such as Amazon ECR or Azure Container Registry, and scanned with zero high-severity CVEs. It may also include rules that restrict dependencies to repositories with verified maintainers or prohibit AI models from unapproved third-party APIs.

In an embodiment, trust policies are implemented in CI/CD pipelines, orchestration frameworks, and runtime enforcement tools such as Kubernetes admission controllers or cloud compliance services.

At S350, a remediation action is initiated. In an embodiment, a remediation action is initiated in response to a violation of a policy. According to an embodiment, a violation of a policy occurs when a software component, deployment action, runtime behavior, and the like, in a computing environment fails to meet the predefined conditions established by a trust policy.

For example, if a container image deployed in Kubernetes is found to originate from an unverified public registry instead of an approved private one, the policy engine (such as an admission controller) is configured to block the deployment, quarantine the pod, etc., to prevent execution.

In another example, if a virtual machine is launched using an image containing known high-severity CVEs, the CI/CD pipeline is configured to automatically fail the build, trigger a rollback to a trusted image, generate an alert, a combination thereof, and the like.

As yet another example, if a code repository introduces a dependency from an untrusted GitHub source, a remediation workflow is initiated to open an automated pull request to replace the dependency with a verified alternative.

In some embodiments, a remediation action includes revoking API access, rotating compromised credentials, re-scanning artifacts, enforcing runtime isolation through sandboxing or network segmentation, a combination thereof, and the like.

These automated or semi-automated responses ensure that violations are addressed immediately, minimizing exposure and maintaining compliance. In essence, remediation actions operationalize trust and security policies by continuously monitoring the environment, detecting noncompliance, and restoring integrity through predefined corrective measures.

Figure 4:
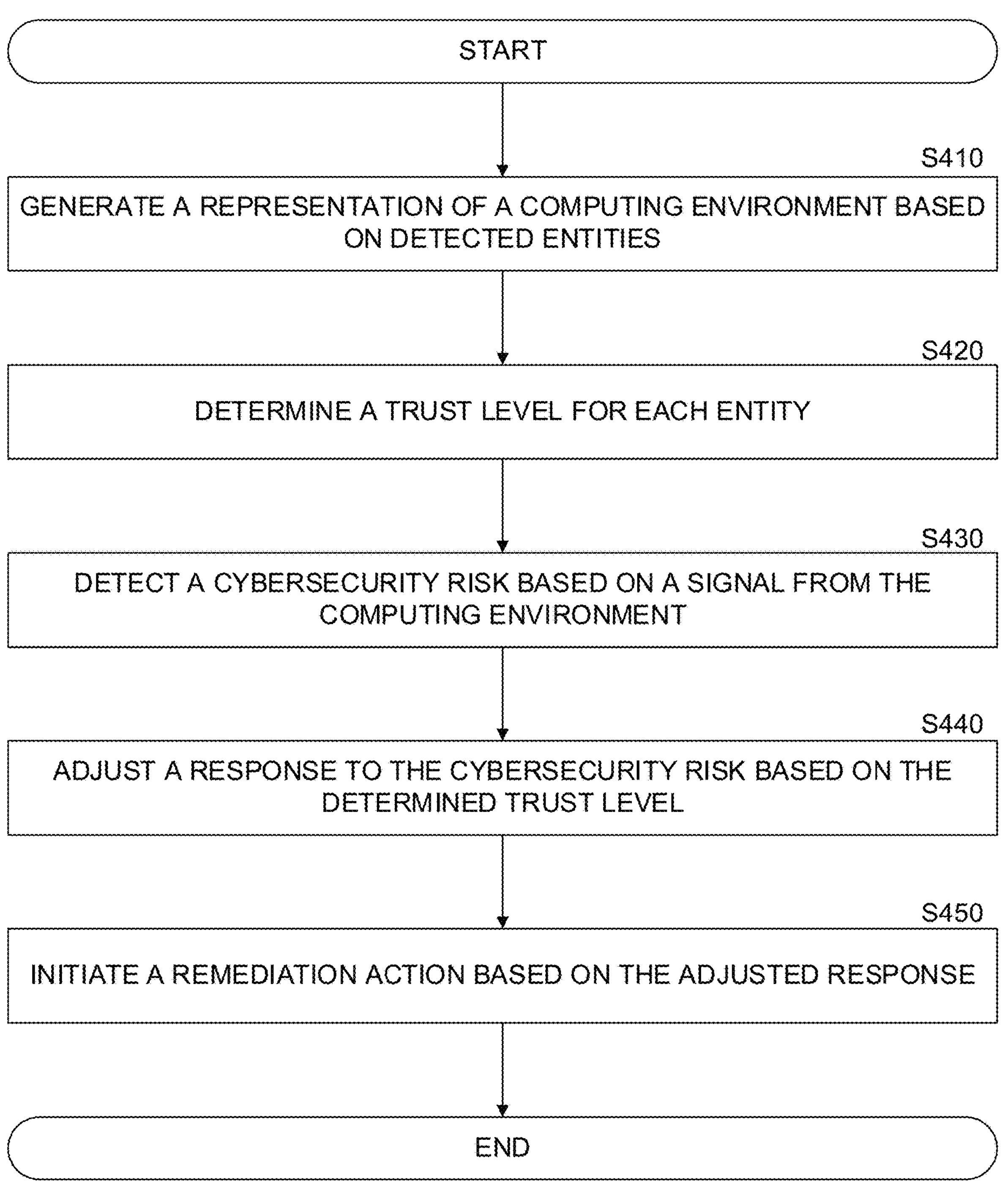
FIG. 4 is an example flowchart of a method for detecting a cybersecurity issue based on a combined risk and trust score, implemented in accordance with an embodiment.

FIG. 4 is an example flowchart of a method for detecting a cybersecurity issue based on a combined risk and trust score, implemented in accordance with an embodiment.

At S410, a representation of a computing environment is generated. In an embodiment, a representation is generated based on a unified schema designed to normalize data collected from heterogeneous security and inventory sources. According to an embodiment, a unified schema enables consistent mapping of entities, such as container images, source code repositories, AI models, third-party SaaS integrations, and runtime environments from multiple computing environments into a single unified representation. According to an embodiment, the representation is generated and stored within a security database, which in some embodiments is implemented as a graph database such as Neo4j®.

In an embodiment, the graph database is configured to model entities and their interdependencies through nodes and edges, where each node represents a distinct entity (for example, a software image, code object, package, or detected vulnerability), and each edge expresses a relationship, such as "depends on," "derived from," or "deployed in." This structure allows complex trust relationships and dependency hierarchies to be visualized and queried efficiently.

In certain embodiments, the security database operates as a hybrid data store, combining a graph database for relationship modeling, a relational database (e.g., PostgreSQL or MySQL) for structured metadata, and an object-oriented or document database (e.g., MongoDB or Couchbase) for flexible enrichment data such as vulnerability reports, scan results, or trust policies. The unified representation enables high-performance cross-referencing of trust scores, provenance, and risk posture across the entire computing environment.

In certain embodiments, the representation is generated through static analysis, including inspection of artifacts such as disk images, source code, deployment manifests, and the like, to extract metadata and configuration attributes.

Complementary runtime telemetry, collected from sensors embedded in cloud resources, contributes dynamic data such as process activity, API calls, and network communications, according to an embodiment. Additionally, in certain embodiments, the representation incorporates information parsed from system and cloud logs, including VPC flow logs, audit trails, and Kubernetes event logs, enabling behavioral context.

At S420, a trust level is determined for each entity in the computing environment. In an embodiment, determining a trust level includes generating a trust score for an entity, for a source (i.e., from which an entity is deployed), a combination thereof, and the like. In an embodiment, a trust score is generated and associated with each entity and its corresponding source to quantify the level of confidence in its integrity, authenticity, and reliability. In certain embodiments, the generation of the trust score is based on a plurality of weighted parameters, including the origin of the source, publisher identity, digital signature status, historical reliability, update frequency, a combination thereof, and the like.

For example, in an embodiment, a container image retrieved from a verified registry, such as Amazon Elastic Container Registry (ECR), that includes a valid cryptographic signature and demonstrates a consistent security patch history is assigned a higher trust score than an unsigned or unverified image obtained from a public repository. In this example, the public repository may be assigned a first trust score, which is lower than a trust score assigned to the verified registry.

In certain embodiments, trust score generation includes utilizing additional analytical dimensions, such as the number and severity of known vulnerabilities (e.g., derived from CVE or NVD databases), dependency relationships across components, prior security incidents linked to the same source, various combinations thereof, and the like. In an embodiment, a scoring model further integrates code quality metrics, maintainer activity levels, reputation indicators obtained from external intelligence feeds, such as verified publisher badges from GitHub or similar ecosystems, combinations thereof, and the like.

In some embodiments, the trust score is dynamically recalculated as new data is ingested. Events such as the disclosure of new vulnerabilities, changes in source ownership, or detection of anomalous behavior automatically influence the score, ensuring that trust evaluation remains current and continuously validated throughout the lifecycle of the entity.

At S430, a cybersecurity risk is detected. In an embodiment, the cybersecurity risk is detected based on a signal from a computing environment. According to an embodiment, a cybersecurity risk is detected based on a plurality of signals from the computing environment. In an embodiment, a signal includes runtime data received from a runtime sensor, log data detected in a cloud log, static analysis results, a combination thereof, and the like.

In an embodiment, a cybersecurity risk is detected within the computing environment through continuous monitoring and multi-signal analysis. In an embodiment, the detection process includes collecting and correlating a variety of cybersecurity signals that provide visibility into the state and behavior of entities, such as workloads, applications, containers, or virtual machines, across the computing environment. In an embodiment, cybersecurity signals may originate from different operational layers, including infrastructure, application, and network telemetry, and are analyzed to identify deviations, anomalies, or indicators of compromise.

In an embodiment, a cybersecurity risk is detected based on a single signal originating from a runtime monitoring sensor deployed on a compute resource. For example, a runtime sensor embedded in a Kubernetes node or virtual machine can detect abnormal system calls, unexpected file modifications, or privilege escalation attempts. Such behaviors may indicate the presence of malware, container breakout, or unauthorized process injection.

According to another embodiment, cybersecurity risk detection is based on a plurality of correlated signals to improve accuracy and reduce false positives. Runtime telemetry may be combined with log data from cloud services, such as AWS CloudTrail, Azure Activity Logs, or GCP Audit Logs, to identify patterns suggesting lateral movement or unauthorized API activity. For instance, a spike in failed authentication events followed by successful access from a new region can trigger a high-confidence detection of potential credential compromise.

In some embodiments, static analysis results contribute to the detection of latent risks before execution. An inspector is configured to evaluate code objects, configuration files, or infrastructure-as-code templates for embedded secrets, misconfigurations, or the use of vulnerable packages. When combined with runtime data, these insights form a holistic risk picture spanning both build-time and operational phases.

At S440, a response to the cybersecurity risk is adjusted based on the determined trust level. In an embodiment, a response to a detected cybersecurity risk on an entity is an action designed to mitigate, contain, remediate, etc., the identified threat. In an embodiment, the response varies depending on the severity of the detected risk, the context of the entity, the trust level associated with that entity and its source, a combination thereof, and the like.

For example, where a risk is detected on a high-trust entity (e.g., a container image verified through digital signatures and sourced from a controlled registry such as Amazon ECR or Azure Container Registry), the inspection controller is configured to initiate a response action. In an embodiment, a response action includes generating an alert, isolating telemetry for deeper analysis, scheduling a patch during the next maintenance cycle, a combination thereof, and the like.

As another example, when the affected entity originates from a low-trust or unknown source, the response becomes more assertive. For example, if a runtime sensor detects anomalous outbound connections from a container image downloaded from an unverified public registry, the inspection controller is configured to initiate quarantine or termination of the instance, revoke credentials, block network egress to prevent lateral movement, various combinations thereof, and the like. Similarly, if a result of static analysis indicates that an application dependency from an untrusted GitHub repository contains embedded malware, the CI/CD pipeline is configured to automatically fail the build, remove the package, and substitute it with a verified alternative.

In some embodiments, policy engines dynamically adjust response actions based on both the trust score and risk severity. For example, a medium-severity vulnerability detected in a high-trust source may trigger only a patching workflow, whereas the same vulnerability in a low-trust component results in immediate deactivation or blacklisting, according to an embodiment.

This trust-aware response framework enables adaptive defense. By prioritizing containment and remediation for high-risk, low-trust components while allowing controlled recovery or deferment for verified, high-trust assets, security enforcement is balanced with operational continuity across complex cloud and hybrid environments.

At S450, a remediation action is initiated based on the adjusted response. In an embodiment, the adjusted remediation action is initiated based on the determined trust level and the cybersecurity risk. In an embodiment, a remediation action is initiated when a policy violation is detected within the computing environment. A policy violation occurs when a software component, deployment process, or runtime behavior fails to comply with the conditions defined by a trust or security policy.

For example, if a container image deployed in a Kubernetes cluster is sourced from an unverified public registry instead of an approved private registry, the policy engine, such as an admission controller, may intercept the deployment request and immediately block execution or quarantine the pod to prevent untrusted code from running.

In another embodiment, when a virtual machine is launched using an image containing known high-severity vulnerabilities (CVEs), the CI/CD pipeline automatically responds by failing the build, rolling back to a previously verified image, and generating an alert for the security operations team.

As another example, if a code repository introduces a new dependency retrieved from an untrusted GitHub source, a remediation workflow is triggered to open an automated pull request that replaces the unverified dependency with a digitally signed and verified alternative.

According to an embodiment, additional remediation actions include revoking API credentials, rotating compromised access tokens, re-scanning artifacts, enforcing runtime isolation through network segmentation or sandboxing, a combination thereof, and the like.

These responses ensure that policy violations are addressed in real time, minimizing exposure to threats and maintaining continuous compliance. In an embodiment, remediation actions operationalize trust policies by continuously monitoring the computing environment, detecting deviations, and restoring integrity through predefined corrective workflows.

Figure 5:
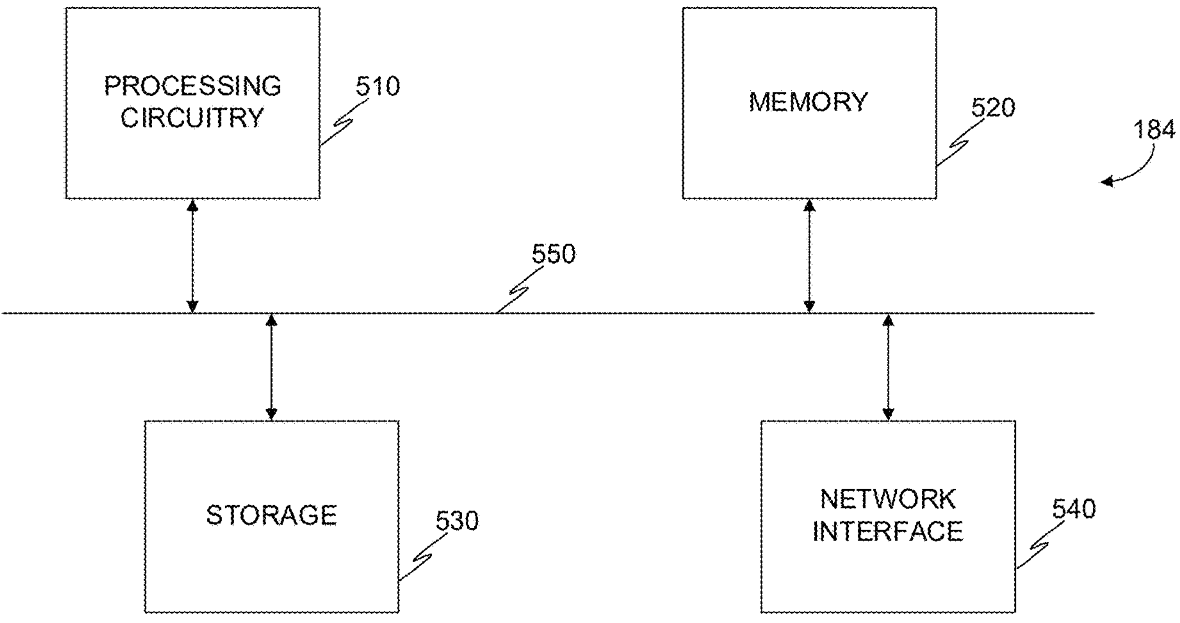
FIG. 5 is an example schematic diagram of an inspection controller according to an embodiment.

FIG. 5 is an example schematic diagram of an inspection controller 184 according to an embodiment. The inspection controller 184 includes, according to an embodiment, a processing circuitry 510 coupled to a memory 520, a storage 530, and a network interface 540. In an embodiment, the components of the inspection controller 184 are communicatively connected via a bus 550.

In certain embodiments, the processing circuitry 510 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 520 is a volatile memory (e.g., random access memory, etc.), a non-volatile memory (e.g., read only memory, flash memory, etc.), a combination thereof, and the like. In some embodiments, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein is stored in the storage 530, in the memory 520, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 510, cause the processing circuitry 510 to perform the various processes described herein, in accordance with an embodiment.

In some embodiments, the storage 530 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 540 is configured to provide the inspection controller 184 with communication with, for example, the inspector 182, the security database 186, the computing environment 170, and the like, according to an embodiment.

It should be understood that the embodiments described herein are not limited to the specific architecture illustrated in FIG. 5, and other architectures may be equally used without departing from the scope of the disclosed embodiments.

Furthermore, in certain embodiments, the inspector 182, the inspection controller 184, the security database 186, the sensor backend server 188, a combination thereof, and the like, may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for trust-aware cybersecurity detection, comprising:

generating a representation of a computing environment including a plurality of entities;

determining a trust score for each entity of the plurality of entities, wherein a first entity of the plurality of entities is a resource deployed in the computing environment;

detecting a disk of the resource;

generating an inspectable disk based on the detected disk;

statically analyzing the inspectable disk for a cybersecurity object associated with the resource;

receiving from a computing environment a plurality of cybersecurity signals, including: a first cybersecurity signal based on runtime detections from a sensor deployed on a resource in the computing environment, and a second cybersecurity signal based on the static analysis result;

detecting in the first cybersecurity signal of the plurality of cybersecurity signals, a cybersecurity issue and an identifier of a resource associated with the cybersecurity issue;

selecting a response action based on the cybersecurity issue;

adapting the response action to the cybersecurity issue based on the determined trust score; and initiating the adapted response action in the computing environment.

2. The method of claim 1, further comprising:

detecting a code repository in the computing environment, the code repository including a plurality of code objects; and generating the static analysis result based on statically analyzing a code object of the plurality of code object.

3. The method of claim 1, further comprising:

detecting a software image repository in the computing environment, the software image repository including a plurality of software images; and generating the static analysis result based on statically analyzing a software image of the plurality of software images.

4. The method of claim 1, further comprising:

detecting in the computing environment an event log, the event log including a plurality of event records;

extracting the plurality of event records from the event log; and receiving a second cybersecurity signal of the plurality of cybersecurity signals based on the extracted plurality of event records.

5. The method of claim 1, further comprising:

selecting the response action from a plurality of response actions, each response action corresponding to the cybersecurity issue.

6. The method of claim 5, further comprising:

selecting the response action further based on the trust score.

7. A non-transitory computer-readable medium storing a set of instructions for trust-aware cybersecurity detection, the set of instructions comprising:

one or more instructions that, when executed by one or more processing circuitries of a device, cause the device to:

generate a representation of a computing environment including a plurality of entities;

determine a trust score for each entity of the plurality of entities, wherein a first entity of the plurality of entities is a resource deployed in the computing environment;

detect a disk of the resource;

generate an inspectable disk based on the detected disk;

statically analyze the inspectable disk for a cybersecurity object associated with the resource;

receive from a computing environment a plurality of cybersecurity signals, including: a first cybersecurity signal based on runtime detections from a sensor deployed on a resource in the computing environment, and a second cybersecurity signal based on the static analysis result;

detect in the first cybersecurity signal of the plurality of cybersecurity signals a cybersecurity issue and an identifier of a resource associated with the cybersecurity issue;

select a response action based on the cybersecurity issue;

adapt the response action to the cybersecurity issue based on the determined trust score; and initiate the adapted response action in the computing environment.

8. A system for trust-aware cybersecurity detection comprising:

a processing circuitry;

a memory, the memory containing instructions that, when executed by the processing circuitry, configure the system to:

generate a representation of a computing environment including a plurality of entities;

determine a trust score for each entity of the plurality of entities, wherein a first entity of the plurality of entities is a resource deployed in the computing environment;

detect a disk of the resource;

generate an inspectable disk based on the detected disk;

statically analyze the inspectable disk for a cybersecurity object associated with the resource;

receive from a computing environment a plurality of cybersecurity signals, including: a first cybersecurity signal based on runtime detections from a sensor deployed on a resource in the computing environment, and a second cybersecurity signal based on the static analysis result;

detect in the first cybersecurity signal of the plurality of cybersecurity signals a cybersecurity issue and an identifier of a resource associated with the cybersecurity issue;

select a response action based on the cybersecurity issue;

adapt the response action to the cybersecurity issue based on the determined trust score; and initiate the adapted response action in the computing environment.

9. The system of claim 8, wherein the memory contains further instructions which when executed by the processing circuitry further configure the system to:

detect a code repository in the computing environment, the code repository including a plurality of code objects; and generate the static analysis result based on statically analyzing a code object of the plurality of code object.

10. The system of claim 8, wherein the memory contains further instructions which when executed by the processing circuitry further configure the system to:

detect a software image repository in the computing environment, the software image repository including a plurality of software images; and generate the static analysis result based on statically analyzing a software image of the plurality of software images.

11. The system of claim 8, wherein the memory contains further instructions which when executed by the processing circuitry further configure the system to:

detect in the computing environment an event log, the event log including a plurality of event records;

extract the plurality of event records from the event log; and receive a second cybersecurity signal of the plurality of cybersecurity signals based on the extracted plurality of event records.

12. The system of claim 8, wherein the memory contains further instructions which when executed by the processing circuitry further configure the system to:

select the response action from a plurality of response actions, each response action corresponding to the cybersecurity issue.

13. The system of claim 12, wherein the memory contains further instructions which when executed by the processing circuitry further configure the system to:

select the response action further based on the trust score.

* * * * *